United States Patent [19]

Frey et al.

[11] Patent Number: 5,481,481
[45] Date of Patent: Jan. 2, 1996

[54] AUTOMATED DIAGNOSTIC SYSTEM HAVING TEMPORALLY COORDINATED WIRELESS SENSORS

[75] Inventors: Donald J. Frey; Michael J. Holtz, both of Boulder, Colo.

[73] Assignee: Architectural Engergy Corporation, Boulder, Colo.

[21] Appl. No.: 979,825

[22] Filed: Nov. 23, 1992

[51] Int. Cl.⁶ ....................................................... G01F 1/56
[52] U.S. Cl. ..................... 364/551.01; 364/556; 364/557; 364/558; 340/825.08; 340/825.15
[58] Field of Search ................................. 364/554, 556, 364/551.01, 557, 558; 370/94.1; 434/214; 395/22; 340/825.08, 825.15

[56] References Cited

U.S. PATENT DOCUMENTS

| | | | |
|---|---|---|---|
| 4,831,558 | 5/1989 | Shoup et al. | 364/554 |
| 4,835,699 | 5/1989 | Mallard | 364/470 |
| 4,875,859 | 10/1989 | Wong et al. | 434/214 |
| 5,130,936 | 7/1992 | Sheppard et al. | 395/22 |
| 5,132,968 | 7/1992 | Cephus | 370/94.1 |
| 5,247,445 | 9/1993 | Miyano et al. | 395/22 |

FOREIGN PATENT DOCUMENTS

| | | | |
|---|---|---|---|
| 0351833 | 7/1988 | European Pat. Off. | G01R 13/06 |
| 0352340 | 7/1988 | European Pat. Off. | G06F 11/30 |
| 0302364 | 7/1988 | European Pat. Off. | G05B 19/417 |
| 0401816 | 6/1990 | European Pat. Off. | G05B 23/02 |

Primary Examiner—Ellis B. Ramirez
Assistant Examiner—Thomas Peeso
Attorney, Agent, or Firm—Duft, Graziano & Forest

[57] ABSTRACT

The diagnostic system makes use of a knowledge based controller and a plurality of data logger units, at least one of which is a wireless unit, to collect temporally coordinated data indicative of the real time operation of a system under test that comprises a plurality of spatially disjunct but operationally interdependent components. The diagnostic system controller automatically architects an instrumentation plan to collect the data and calculates performance factors from this collected data. A comparison of the calculated performance factors with optimum and typical failure mode performance factors identifies performance problems in the system under test.

62 Claims, 17 Drawing Sheets

SYSTEM CHOICES

- AIR DISTRIBUTION
- COOLING DISTRIBUTION
- COOLING PLANT
- ZONES
- HEATING DISTRIBUTION
- HEATING PLANT
- OPTIONS
- CONTINUE

FIGURE 7

AIR DISTRIBUTION SYSTEM

- ☐ UNIT HEATER
- ☐ SINGLE ZONE CONSTANT VOLUME
- ☐ DUAL DUCT
- ☐ DUAL DUCT VARIABLE AIR VOLUME
- ☐ HEATING ONLY
- ☐ 2 PIPE FAN COIL
- ☒ VARIABLE AIR VOLUME
- ☐ MULTIZONE
- ☐ 2 PIPE PRIMARY AIR

HEATING SYSTEM

CENTRAL HEATING

- ☐ HYDRONIC COIL
- ☐ STEAM COIL
- ☐ ELECTRIC RESISTANCE
- ☒ DIRECT FIRED
- ☐ HEAT PUMP

DISTRIBUTED HEATING

- ☐ HYDRONIC BASEBOARD
- ☐ HYDRONIC 2 PIPE FAN COIL WITH COOLING
- ☐ HYDRONIC 2 PIPE FAN COIL
- ☐ HYDRONIC REHEAT VAV BOX
- ☐ CONTINUE

- ☐ HYDRONIC REHEAT FAN POWERED VAV BOC
- ☐ CONSTANT VOLUME REHEAT
- ☐ ELECTRIC RESISTANCE
- ☐ NO HEATING SYSTEM

FIGURE 9

COOLING SYSTEM

CENTRAL COOLING

- ☐ HYDRONIC COIL
- ☐ DIRECT EXPANSION (DX) COIL
- ☒ EVAPORATIVE COOLER

DISTRIBUTED COOLING

- ☐ 2 PIPE SYSTEM
- ☐ NO COOLING SYSTEM

CENTRAL HEATING PLANT

⊠ GAS BOILER

☐ ELECTRIC BOILER

☐ GAS DIRECT FIRED

☐ ELECTRIC RESISTANCE

☐ HEAT PUMP

THE AEC HVAC DIAGNOSTIC SYSTEM

SYSTEM CHOICES

CENTRAL COOLING PLANT

⊠ MECHANICAL CHILLER

☐ ABSORPTION CHILLER

☐ HEAT PUMP

```
                    OPTIONS

☒  RETURN/RELIEF FANS

☐  ECONOMIZER

☒  HUMIDIFICATION

☐  COOLING TOWER

```
                    ZONES

☐  ONE

☐  TWO

☒  THREE

☐  FOUR

ENTER SPECIFIC BUILDING AND SYSTEM INFORMATION

OUTPUT COOLING CAPACITY    (KBTUH)    [    ]

CHILLER ELECTRICAL DEMAND  (KW)       [    ]

OUTPUT HEATING CAPACITY    (KBTUH)    [    ]

DESIGN SUPPLY FAN AIRFLOW  (CFM)      [    ]

DESIGN HOT DECK AIRFLOW    (CFM)      [    ]

DESIGN OUTSIDE AIR FLOW    (CFM)      [    ]

BUILDING ELEVATOR          (FT)       [    ]

ENTER SPECIFIC BUILDING AND SYSTEM INFORMATION

ENTER THE FOLLOWING INFORMATION

CHECK THE OCCUPIED DAYS

ENTER SPECIFIC BUILDING AND SYSTEM INFORMATION

ENTER THE FOLLOWING INFORMATION

ENTER AN INTEGER (1-24) TO INDICATE IN MILITARY TIME WHEN THE SYSTEM IS SCHEDULED TO START AND STOP ON OCCUPIED AND UNOCCUPIED DAYS

|  | START TIME | STOP TIME |
|---|---|---|
| OCCUPIEDDAYS | | |
| UNOCCUPIEDDAYS | | |
|  | ARRIVE | DEPART |

REVIEW INPUTS

| AIR DISTRIBUTION | VARIABLE AIR VOLUME |
|---|---|
| HEAT DISTRIBUTION | |
| COOL DISTRIBUTION | |
| HEATING PLANT | GAS BOILER |
| COOLING PLANT | MECHANICAL CHILLER |
| OPTIONS | RETURN/RELIEF FANS |
| ZONES | 3 |

```
            SET UP DATA LOGGERS
        DATA LOGGERS ASSEMBLED IN BRIEFCASE

SLOT 1          SLOT 2          SLOT 3          SLOT 4
    [    ]          [    ]          [    ]          [    ]
    1 2 3 4         5 6 0 0         1 5 6 0         1 2 3 0

SLOT 5          SLOT 6          SLOT 7          SLOT 8
    [    ]          [    ]          [    ]          [    ]
    1 2 3 4         1 2 0 0         1 2 3 0         5 6 0 0

SLOT 9          SLOT 10         SLOT 11         SLOT 12
    [    ]          [    ]          [EMPTY]         [EMPTY]
    1 2 3 0         1 2 3 4

0 = NONE  1 = TEMPERATURE  2 = HUMIDITY         ☐ CONTINUE
    3 = AIR FLOW         4 = STATIC PRESSURE
    5 = STATUS           6 = ELECTRIC POWER
```

FIGURE 21

```
            SET UP DATA LOGGERS
            INITIALIZE DATA LOGGERS

CHOOSE DATA COLLECTION START DATE AND THE
    DURATION OF THE DATA COLLECTION PERIOD

DATA COLLECTION BEGINS AT MIDNIGHT AT THE
            END OF THE START DATE.

START DATE    (MM/DD/YY)

MONTH         [ 2 ]

DAY           [25]

YEAR          [89]

DURATION      [14]
        (DAYS)

```
ENTER SPECIFIC BUILDING AND SYSTEM INFORMATION

ENTER THE FOLLOWING INFORMATION

COOLING SUPPLY DUCT AREA (SQUARE FEET).   [    ]

HEATING SUPPLY DUCT AREA (SQUARE FT)       [    ]
   NOTE: FOR DUAL DUCT SYSTEMS ONLY

RETURN DUCT AREA (SQUARE FEET)             [    ]

```
DOWNLOAD DATA LOGGERS

SET DATA ANALYSIS START AND STOP DATES

CHOOSE THE DATA ANALYSIS START AND STOP DATES
THE DATES MUST BE BETWEEN THE INITIAL DATES SHOWN

START MONTH [  ]     END MONTH [  ]

START DAY   [  ]     END DAY   [  ]

START YEAR  [  ]     END YEAR  [  ]
                 CONTINUE [  ]
```

FIGURE 24

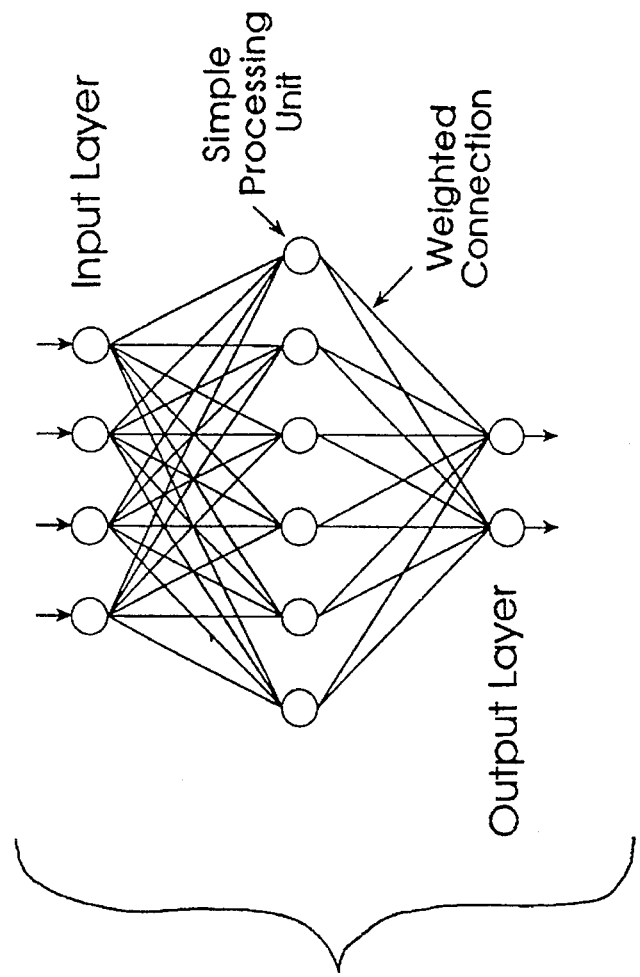
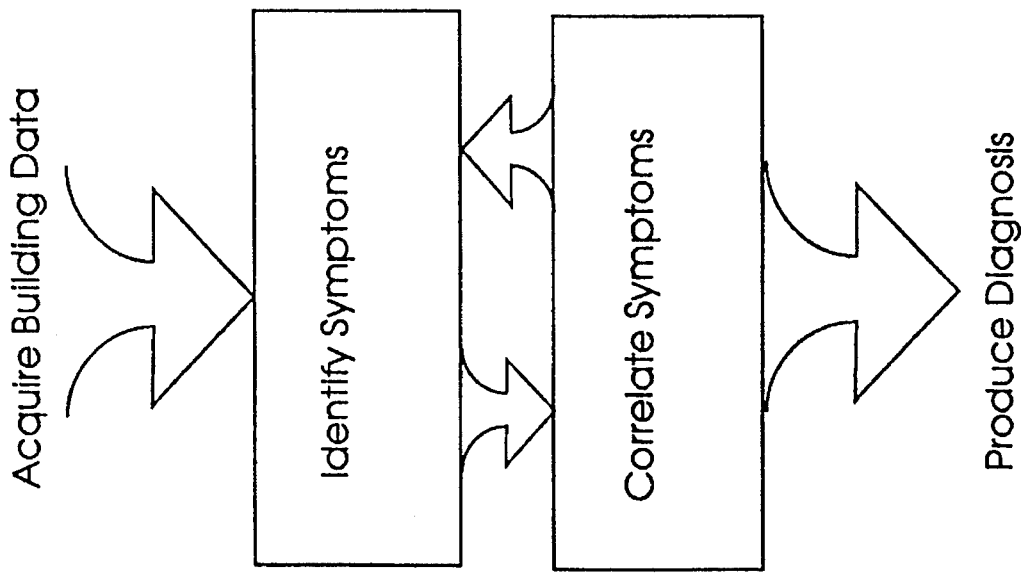
FIGURE 28

AUTOMATED DIAGNOSTIC SYSTEM HAVING TEMPORALLY COORDINATED WIRELESS SENSORS

FIELD OF THE INVENTION

This invention relates to diagnostic systems and, in particular, to a method and apparatus for using temporally coordinated wireless sensors to monitor and analyze the performance of a system under test.

PROBLEM

It is a problem in the field of diagnostic systems to perform real time monitoring of a system under test that contains a plurality of operationally interdependent components that can be separated by significant physical distances. The accurate analysis of a complex system under test typically requires the collection of data from the plurality of components that comprise the system under test and the collected data should preferably be coordinated in time to obtain an accurate picture of the dynamic operating state of the system under test. This goal is extremely difficult to achieve when the components of the system under test are separated from each other by significant physical distances, such as in the case of a heating, ventilating and air conditioning (HVAC) system although this problem is not limited to this application.

Existing HVAC diagnostic equipment either monitors individual components of the system under test in a temporally uncoordinated manner or provides the temporal coordination by hardwiring all the sensors to the central data gathering unit from all of the test points in the system under test. It is obvious that in an HVAC installation that encompasses a large structure, the cost and extent of hardwiring that must be provided to dynamically monitor all the physically disjunct components renders such real time coordinated data gathering and analysis costly at best. Therefore, existing HVAC diagnostic systems collect asynchronous data, under the presumption that the operation of a typical HVAC system is largely steady-state and any temporal anomalies occurring in the operation of the HVAC system are relatively insignificant. Alternatively, the diagnostic systems are used to monitor the performance of a single component, wherein the diagnostic equipment can be collocated with the particular component under test and extensive wiring to sensors is therefore not required.

Another limitation of existing diagnostic systems is that the user performing the test is required to have a sophisticated understanding of the operations being performed by the system under test. The tasks of installing instrumentation in the system under test and calibrating the instrumentation are non-trivial. The user must also analyze the extensive amount of data that is produced by the diagnostic system to identify performance problems in the system under test. Diagnostic systems that are easy to use are generally applicable only to a single narrowly defined component under test and can perform only very limited testing to detect and identify only rudimentary performance problems.

There does not presently exist any diagnostic system that is simple to use and can monitor and test a system under test that includes physically disjunct components to diagnose performance problems therewith.

SOLUTION

The above described problems are solved and a technical advance achieved in the field by the diagnostic system of the present invention that comprises a knowledge based controller and a plurality of data logger units, at least one of which is a wireless unit, for monitoring a system under test that typically includes spatially disjunct components. The system under test can be any substantially deterministically operating entity, whether a mechanical, electrical, fluid, or biological based system. The knowledge based controller enables the user to input system definition data to identify the architecture, principal components and operational characteristics of the system under test. In response to this user supplied input data, the diagnostic system controller automatically architects a series of system parameter measurements to be performed on the system under test. The controller displays to the user a desired configuration of sensors that must be installed in the system under test to perform the selected parameter measurements. The diagnostic system controller guides the user via a display device to configure the sensor instrumentation contained in the plurality of data loggers, at least one of which is a wireless unit.

The plurality of data loggers are programmed by the diagnostic system to be temporally synchronized to collect their respective parameter measurement data from the installed sensors at the spatially diverse locations in real time in synchronized fashion. This temporal synchronicity provides a real time snapshot of the performance of the system under test even though the data loggers are installed by the user in spatially diverse locations in the system under test and are not physically interconnected with the controller during the data gathering process. The wireless data loggers can be portable battery powered units or locally powered units. The data loggers collect and store parameter measurement data for later downloading to the diagnostic system controller or for wireless transmission to the controller in real time to produce time synchronized data from the plurality of different sensors at spatially diverse locations to enable the controller to perform an analysis of the real time operation of the system under test, which analysis can be performed off-line at a point later in time.

The various data loggers are typically retrieved by the user from their installed locations in the plurality of components of the system under test upon completion of the data gathering phase of operation. However, the data loggers can transmit data via radio frequency signals and can be left in place in components of the system under test. The data loggers are usually retrievable units that are connected to the diagnostic system controller to download their stored parameter measurement data into the controller. The controller then stores the time coordinated data in its memory to create a database comprising a plurality of time coordinated data points, each of which is indicative of a particular parameter measured at a selected component of the system under test at a predetermined point in time. The controller makes use of a knowledge based system such as an artificial neural network to analyze the collected data and compare the collected data to optimal and typical failure mode system under test performance data to identify system performance anomalies. A plurality of measured performance factors are computed from the collected sensor data to determine the efficacy of the system under test and to identify components therein that are not operating properly as specified by the optimum and failure mode performance information stored in the diagnostic system. Based on the detected and identified performance anomalies, the diagnostic system can identify suspect components in the system under test whose performance is degraded and either identify additional tests to be performed on the system under test or, through further analysis of the originally collected data, identify likely components in the system under test that are failing to operate pursuant to their nominal specifications.

The temporal coordination of the data gathering via wireless units at a plurality of spatially disjunct locations enables the diagnostic system to obtain a set of data indicative of the real time operation of the system under test for an extended period of time to detect not only gross anomalies in the performance thereof but also subtle and transient discontinuities in operation that heretofore could not be detected by existing diagnostic systems. Furthermore, this diagnostic system is knowledge based to enable a relatively unsophisticated user to configure the sensors, install them in designated locations in the system under test to collect the data, perform the diagnostic tests and analyze the results therefrom to identify maintenance or performance problems in the system under test.

BRIEF DESCRIPTION OF THE DRAWING

FIGS. 7–25 illustrate exemplary information input screens used in the diagnostic system;

FIG. 27 illustrates in graphical form a typical performance factor analysis used by this diagnostic system to identify maintenance problems within the system; and FIG. 28 illustrates in block diagram form the overall architecture of the diagnostic process and apparatus used by this diagnostic system.

DETAILED DESCRIPTION

Figure 1:
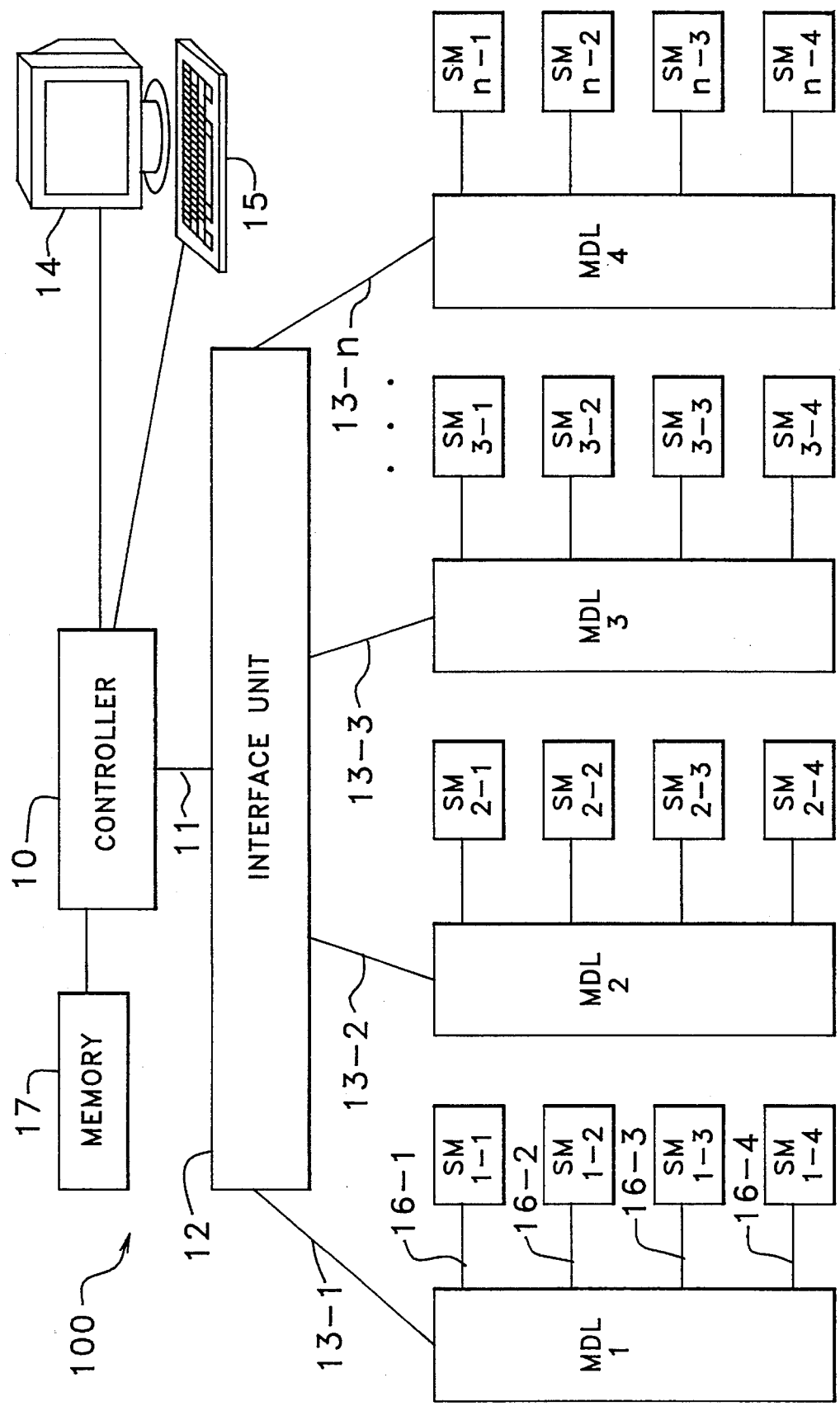
FIG. 1 illustrates in block diagram form the overall architecture of the diagnostic system of the present invention.

FIG. 1 illustrates in block diagram form the overall architecture of the preferred embodiment of the diagnostic system 100 of the present invention. The diagnostic system 100 is a processor based system that makes use of a controller 10, such as a personal computer, to execute the instructions that are programmed into the diagnostic software loaded in controller 10 to implement the diagnostic system 100 of the present invention. The parameter measurement units used in diagnostic system 100 comprise a plurality of data loggers MDL*, each of which is programmed to perform a plurality of measurements by the installation of corresponding sensor elements SM* into the plurality of connectors (not shown) contained in the data loggers MDL*. Each of the data loggers MDL* itself can be plugged via a cable 13* into a corresponding connector (not shown) in an interface unit 12 that serves to interconnect a plurality of data loggers MDL, with controller 10 via cable 11. Preferably, controller 10 is equipped with a printer (not shown) to thereby provide the user with a permanent copy of the test results produced by the diagnostic system 100.

In the preferred embodiment of the invention disclosed herein, the diagnostic system 100 is implemented as a heating, ventilating and air conditioning (HVAC) diagnostic system used to measure and analyze the performance of a heating, ventilating and air conditioning system that is installed in a large structure, such as an office building. The HVAC system has a plurality of operationally interdependent components that are distributed throughout the entirety of the structure. The difficulty of interconnecting sensors to collect the appropriate temperature, humidity, air flow and static air pressure measurements at a sufficient number of the components of a typical HVAC system distributed throughout the structure render such tests impractical using existing diagnostic systems. The apparatus of the present invention renders such measurement and testing simple to perform by use of temporally coordinated wireless data loggers MDL, and provides performance analysis data heretofore unavailable by using a knowledge based controller to analyze the collected data. The HVAC system is simply an example of a system under test and the apparatus and concepts described herein are equally applicable to any entity that operates in a deterministic manner and is especially useful to diagnose systems that are multi-variable.

Data Logger

Figure 3:
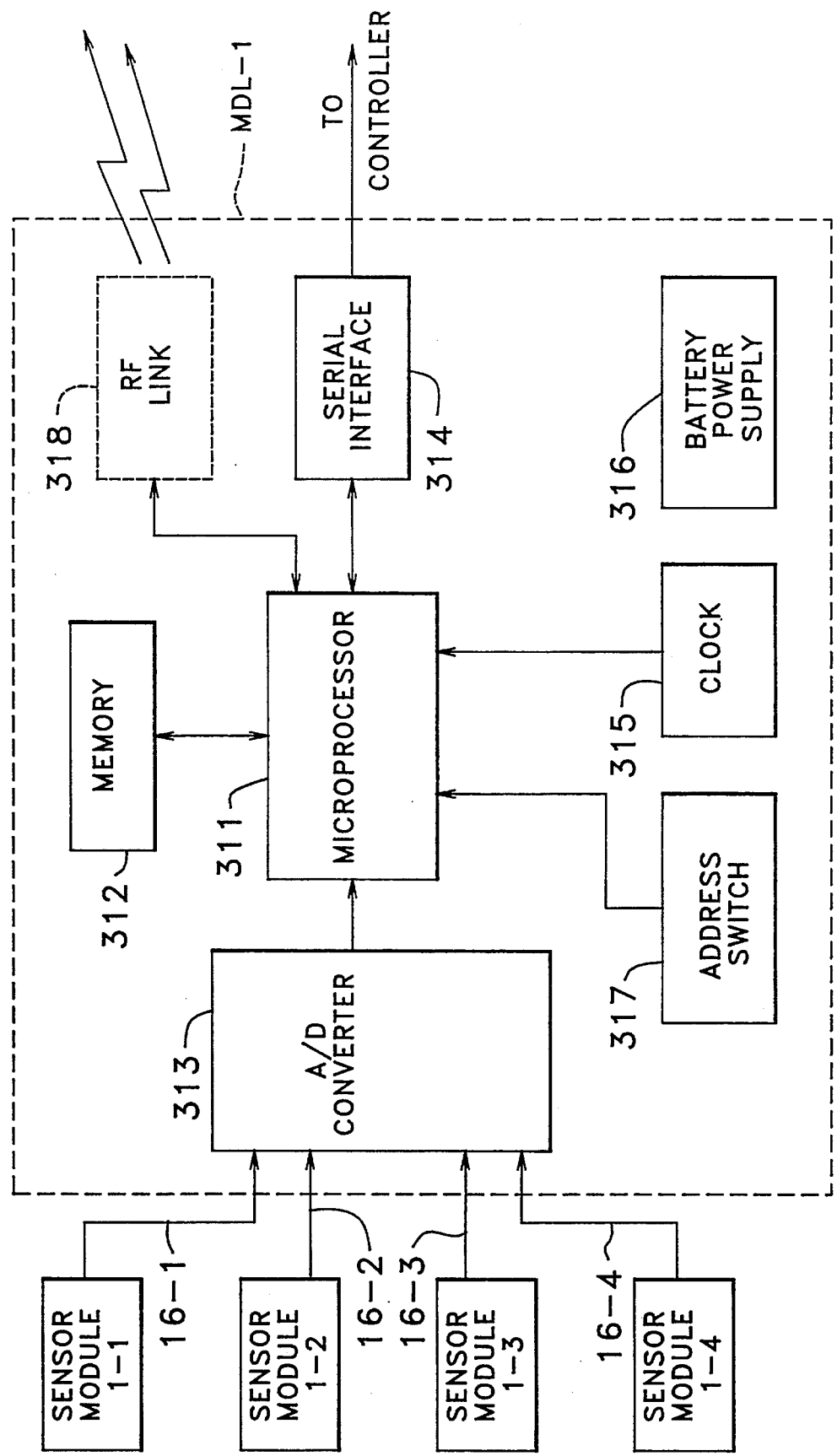
FIG. 3 illustrates a block diagram of an exemplary data logger circuit used in this system.

FIG. 3 illustrates in block diagram form the overall architecture of a typical data logger circuit MDL-1 that can be plugged into the interface unit 12. The data logger MDL-1 is a microprocessor-based data collection device that interfaces a plurality of sensor modules SM1-1 to SM1-4 to interface unit 12. The data logger MDL-1 includes a microprocessor 311 which controls the operation of the data logger MDL-1 based on preprogrammed instructions that are stored in the memory 312. The microprocessor 311 is connected to a plurality of sensor modules SM1-1 to SM1-4 via an analog to digital converter 313 and to the interface unit 12 via a serial interface 314. The analog to digital converter 313 can also function as a multiplexer to enable the microprocessor 311 to read data seriatim from each of the plurality of sensor modules SM1-1 to SM1-4. Optionally, a radio frequency link 318 can be provided in lieu of serial interface 314 to exchange control and data signals with interface unit 12 via RF transmissions using, for example, a low power RF transmitter such as a cellular office phone transmitter.

The data that is read from a sensor module SM, typically represents an analog voltage or current signal indicative of a predetermined parameter that is measured by the sensor elements contained within the sensor module SM*. For example, in a heating, ventilating and air conditioning diagnostic system, a sensor modules SM1-1 can comprise a temperature monitor which produces a voltage indicative of the temperature measured at the particular locus at which the sensor module SM1-1 is placed. Similarly, other sensor modules SM1-2 to SM1-4 measure relative humidity, or air flow, or static air pressure, or operational voltage of the component under test, or switch closures, etc. To monitor the performance of a component of a system under test, a subset SM1-1 to SM1-4 of the plurality of possible sensor modules is interconnected with the analog to digital converter circuit 313 of a data logger MDL1-1 in order to enable the microprocessor 311 to obtain data therefrom indicative of measurements of environmental parameters that are taken on a continual basis by the various sensor modules (SM1-1 to SM1-4). The microprocessor 311 operates to periodically poll each of the sensor modules (SM1-1 to SM1-4) and store in digital form, in memory 312 for later retrieval by the interface unit 12, the data obtained therefrom indicative of the particular environmental parameter that is measured during that sampling interval. A clock 315 is resident in the data logger MDL-1 to provide an indication of the real time in order to enable microprocessor 311 to coordinate its operation with other data loggers MDL-2 to MDL-4 in use to monitor various components of the system under test in a temporally coordinated manner. Also optionally included in the data logger MDL-1, is a battery 316 which enables the data logger MDL-1 to operate independent of a local source of power to collect the data via the plurality of sensor modules SM1-1 to SM1-4. A serial interface 314 is also connected to the microprocessor 311 to interconnect data logger MDL-1 with the interface unit 12 to exchange data therebetween. The operation of data logger MDL-1 in conjunction with interface unit 12 is described in further detail below.

Software Architecture

Figure 2:
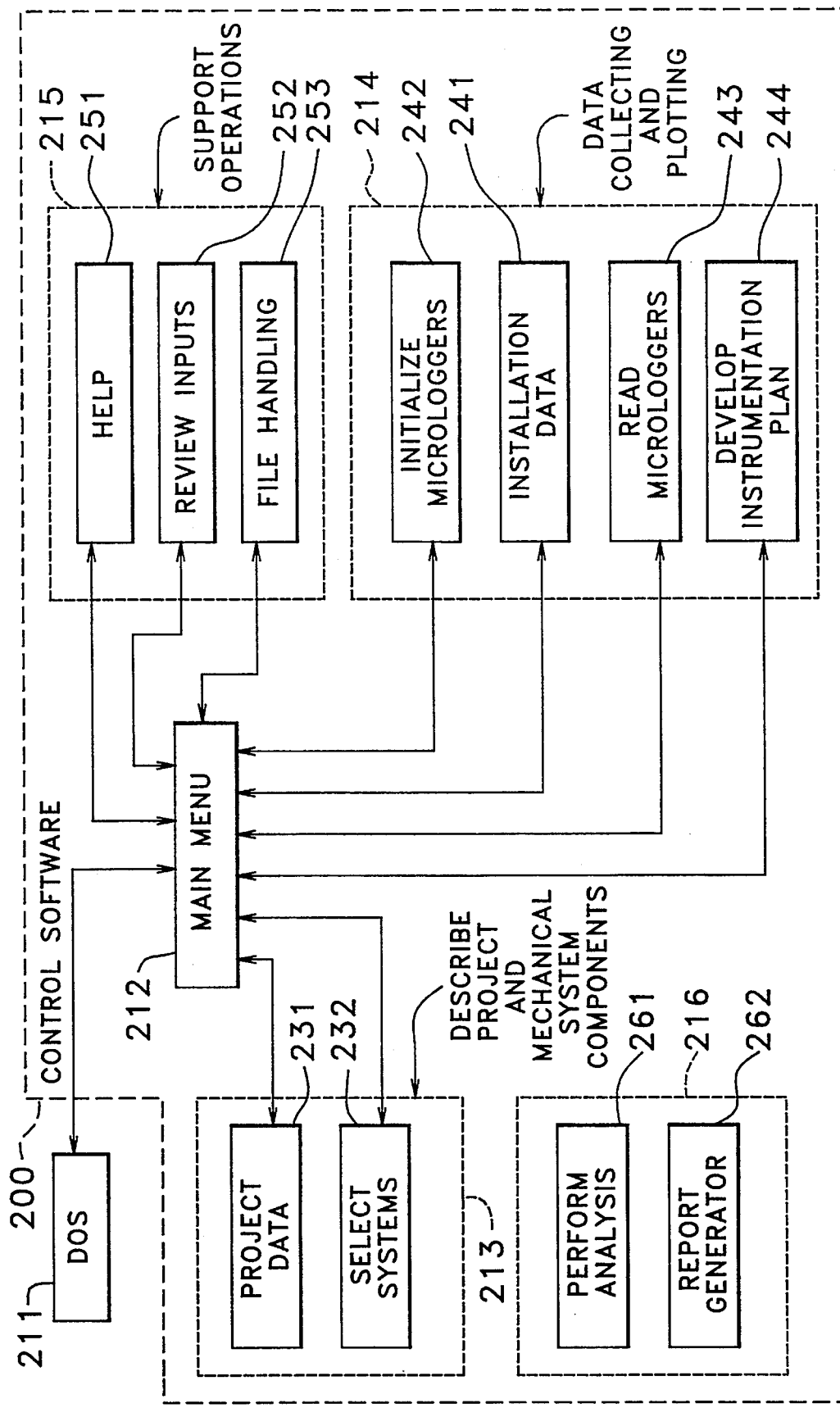
FIG. 2 illustrates in block diagram form the software architecture used within the diagnostic system of the present invention.

FIG. 2 illustrates in block diagram form the overall architecture of the control software 200 contained within controller 10. An operating system such as DOS 211 is resident on controller 10 to provide the platform on which this particular set of control software 200 operates. A main menu program 212 provides the user interface via the terminal keyboard 15 and display 14 to enable the user to sequence through the operational steps required to activate the diagnostic system 100. Connected to the main menu program 212 are a plurality of diagnostic system software components 213–216 each of which consists of a set of subroutines. A first software component 213 is used to enable an operator to describe the particular system under test and its mechanical and electrical components. An additional software component 214 is a set of subroutines used for data collection while software component 215 consists of subroutines used for support operations and software component 216 consists of subroutines used for data analysis and report plotting.

Reviewing these software components in reverse order, the support operations software component 215 consists of a plurality of subroutines 251–253 used to manipulate the data received by controller 10 from the user interface keyboard 15 or from the plurality of data loggers MDL*. Included in the support operations software component 215 is a set of help commands 251 that enable the user via the main menu software 212 to query the diagnostic system 100 to obtain information on the operation of the diagnostic system 100 without having to resort to an instruction manual. This type of software component is typically found in all sophisticated software systems and is not described in any detail herein in order to simplify the description. Further subroutines used for support are a review inputs subroutine 252 used to examine the data obtained from both the user interface keyboard 15 and the data loggers MDL* to ensure their validity in the context in which they are received. Another subroutine is the file handling subroutine 253 which manages all the files that are created on this diagnostic system 100 both for data collection and plotting purposes.

The data collection software component 214 of the diagnostic system 100 consists of subroutines 241–244 to perform the data gathering and data analysis functions. The installation data subroutine 241 is used to install the software on controller 10 at the time the diagnostic system 100 is first initialized. The develop instrumentation plan software 244 is used to determine, based upon the system definition data input by the user, the number, type, and installation location of the sensors used to perform measurements on the system under test 400. The initialize data loggers subroutine 242 is used to program each of the plurality of data loggers MDL* that are used to perform the data gathering function for the system under test analysis. This subroutine 242 sequentially polls the plurality of data loggers MDL* that are interconnected via an electrical interface to interface unit 12 to coordinate the clocks 315 contained therein and to program the microprocessors 311 contained in the data loggers MDL, to initiate the sequence of measurements at a predetermined time and to operate the various sensor modules SM* in a particular manner as defined by the initialize data logger subroutine 242. The read data logger subroutine 243 is used to download data from the plurality of data loggers MDL, that are used to collect the parameter measurements during the system test procedure. The data that is read by this subroutine 243 is stored in memory 17 of controller 10 in a closely coupled and coordinated manner in order to provide temporally synchronized sets of data indicative of measurements concurrently taken over all of the components of the system under test for a particular sampling interval. The perform analysis subroutine 244 makes use of the data that is read from the plurality of data loggers MDL* to analyze the system under test and its various components to compare the operational data obtained therefrom with predetermined optimal and failure mode performance factors to note anomalies therebetween. The develop performance factors subroutine 261 also makes use of detected anomalies to perform a maintenance analysis to identify most likely components of the system under test that are failing to operate properly as is disclosed in further detail below. Finally, report generator software 262 generates output data to indicate the results of the diagnosis based upon the measurements taken.

The component description section 213 of the software architecture contains two routines 231, 232, one of which (231) is used to receive data to identify the particular system under test. This consists of administrative data indicative of factors such as the identity of the system owner, physical location of the system and the various administrative and project identification indicia that must be coordinated with the data that is generated via the measurements and analysis in order to provide a complete file history that can be uniquely identified in the controller 10. The select system subroutine 232 is used to query the user to obtain information to define the overall collection of operationally interdependent components that comprise the system under test and their particular interconnection and nature.

Architecture of System Under Test

Figure 4:
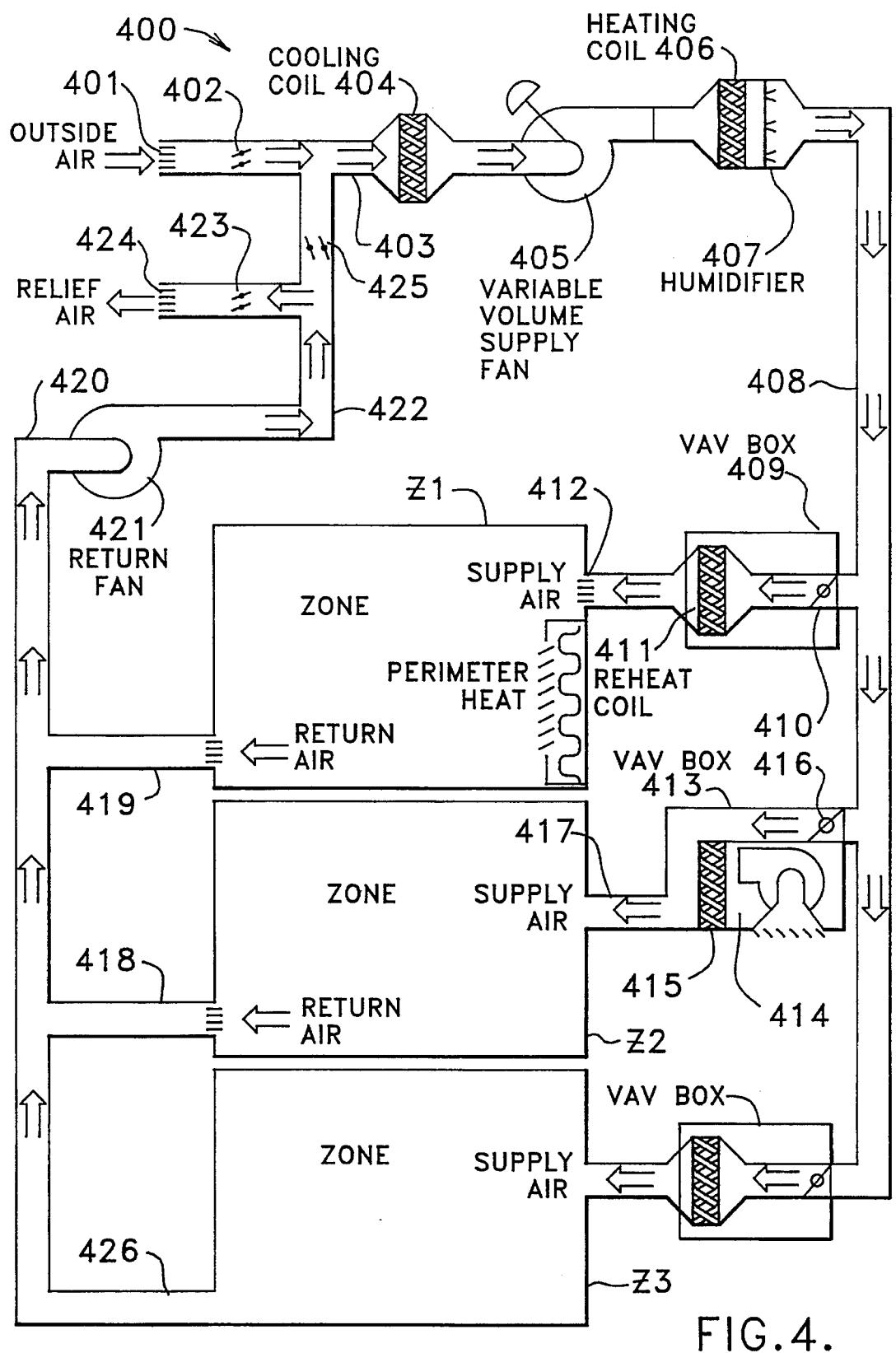
FIG. 4 illustrates the overall architecture of a typical system under test.
Figures 25, 27:
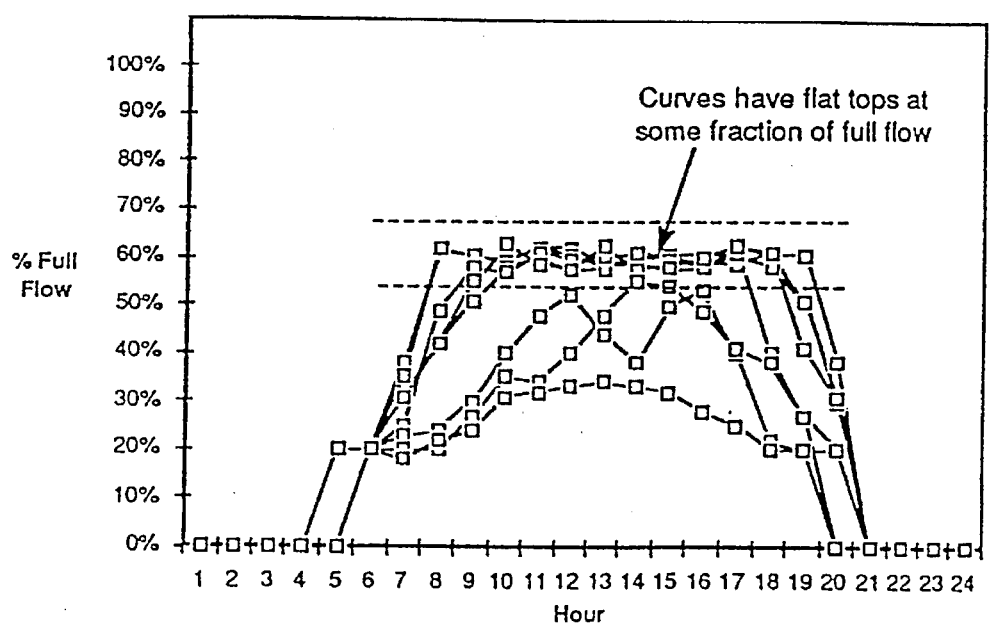
Figure 26:
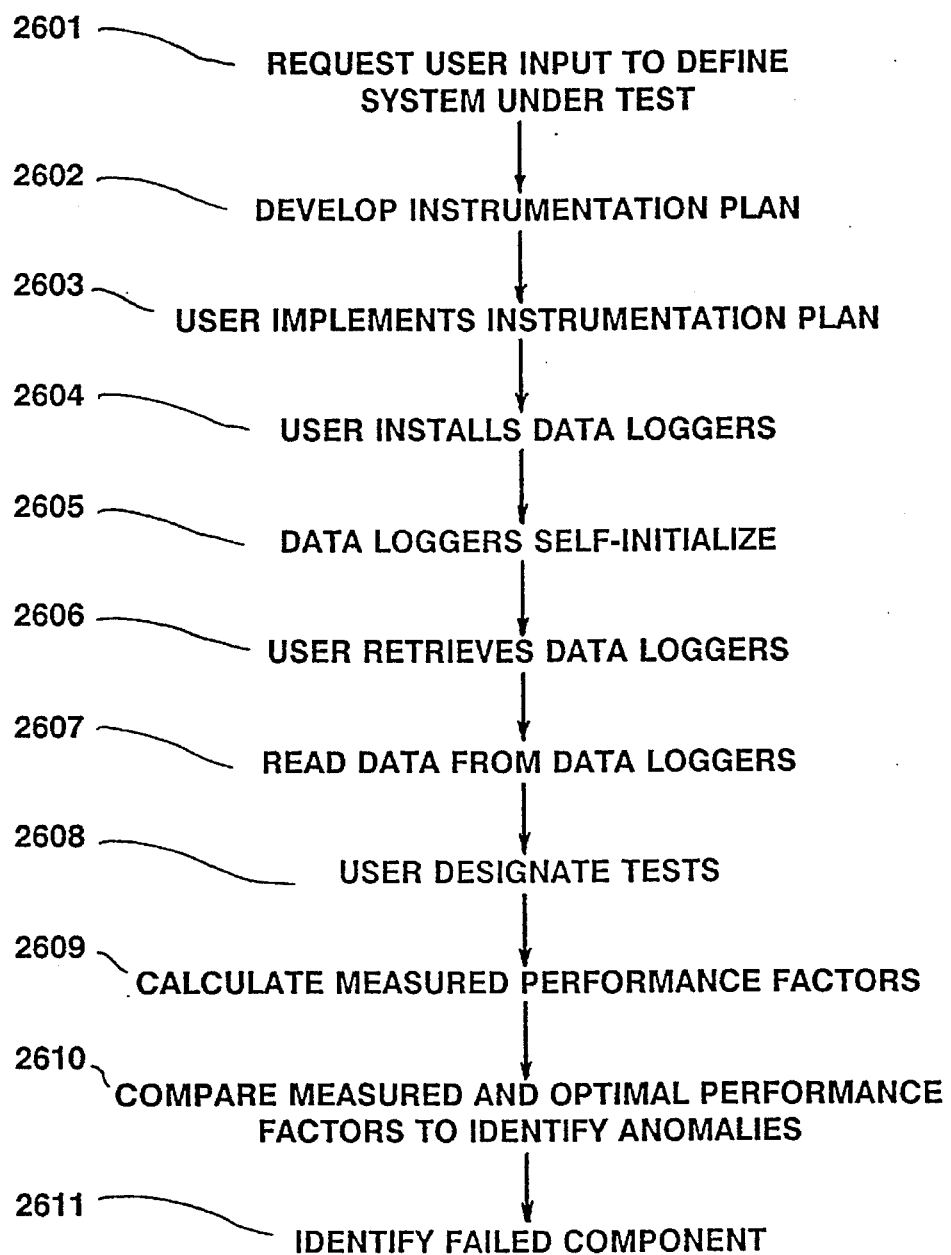
FIG. 26 illustrates in flow diagram form the operational steps taken by the diagnostic system to perform a typical test.

FIG. 26 illustrates in flow diagram form the primary operational steps taken by the diagnostic system 100 to perform the diagnostic and maintenance function. The operational steps illustrated in flow diagram form in FIG. 26 are further elaborated in the user interface screens of FIGS. 7–25 that are displayed by the diagnostic system 100 on display 14 in order to query the user and obtain proper data inputs via user interface keyboard 15. FIG. 4 illustrates a typical system under test 400 architecture that is used to demonstrate the operational features of the diagnostic system 100.

There are eleven basic steps 2601–2611 used by the automated diagnostic system 100 to perform a typical analysis of a system under test 400. For the purpose of this description, the system under test 400 is selected to be a heating, ventilating and air conditioning (HVAC) system 400 that makes use of a variable air volume architecture that is well known in this technology. The overall architecture of such an HVAC system 400 is illustrated in FIG. 4 wherein outside air enters a set of ventilation ducts 403 via intake 401 which contains dampers 402 to regulate the flow of the outside air into the HVAC system 400. A cooling coil 404 is used to chill the air that circulates through HVAC system 400. The air output from the cooling coil 404 is connected to a variable volume supply fan 405 which regulates the volume of air flow through the air supply ducts 408 for the entire structure in which this heating, ventilating and air conditioning system 400 is installed. The output of the variable volume supply fan 405 is connected to a heating coil 406 which is also equipped with an optional humidifier 407 to prevent the air circulating throughout the structure from being drier than specified by the user.

The output air flow from the variable volume supply fan 405, as heated and humidified by the heating coil 406 and humidifier 407, circulates through a plurality of ducts 408 to a plurality of variable air volume distribution boxes 409, 413, 427. These distribution boxes 409, 413, 427 each contain a damper 410, 416, 428, respectively to regulate the air flow from the main supply ducts 408 into the distribution box 409, 413, 427 and out therefrom into the local zone Z1, Z2, Z3 that is to be heated or cooled. The variable air volume distribution box 409, 413, 427 can optionally include a heating coil 411, 415, 429, respectively, or additional fans 414. The output of the variable air volume distribution box 409, 413, 427 is connected via local duct 412, 417, 430, respectively to air supply vents that are used to input the conditioned air into the user occupied zones Z1, Z2, Z3 within the structure.

A typical structure that makes use of a variable air volume HVAC system 400 is a large office building that contains a number of floors, each of which can be divided into a plurality of conditioning zones Z1–Z3. Therefore, a large variable air volume HVAC system 400 can contain numerous zones Z1–Z3, each of which has its own locally controlled flow of conditioned air, obtained from variable air volume distribution boxes 409, 413, 427. Each zone Z1–Z3 in the building contains human occupants and equipment that present different heating, cooling and humidifying loads for the conditioned air that is supplied to the zone Z1–Z3 by the distribution box 409, 413, 427. A set of return air ducts 419, 420, 426 are provided from each zone Z1–Z3 to a master return duct 420 that is equipped with a return fan 421 to draw air from each of the occupied zones Z1–Z3 within the building and deliver this return air to the cooling coil 404, heating coil 406 and humidifier 407 as described above. The output air flow from the return fan 421 is carried by a return duct 422 that includes a relief duct 424 that vents some of the return air to the outside environment and this vented air is replaced by fresh air obtained from the outside air intake 401. Dampers 402, 423, 425 are provided in each of these ducts 401, 424, 422 in order to controllably regulate the quantity of outside air, return air and relief air that flows therein.

It is obvious that in a multi-story structure that contains numerous zones Z1–Z3 to be supplied with conditioned air, the temporally coordinated monitoring of the various components in this HVAC system 400 represents a task of staggering proportions. There are numerous variable air volume distribution boxes 409, 413, 427, local heating coils 411, 415, 429, local fans 414, a return fan 421, a master cooling coil 404, a master variable volume supply fan 405, a heating coil 406 and humidifier 406, many feet of air flow ducts 408, 420, 422, thermostats as well as locations within each zone Z1–Z3 that should be monitored to identify locations that are not receiving the proper flow of conditioned air or are creating localized thermal anomalies that are not being properly conditioned by the standard variable air volume HVAC system 400. An example of this local anomaly problem is a high capacity copy machine that is installed in a small enclosed space, which copy machine is run on a fairly continual basis and produces a significant amount of heat. The standard design of a variable air volume heating, ventilating and air conditioning system 400 does not account for the installation of such equipment and manual adjustment of the HVAC system 400 to compensate for such equipment can be ineffectual if the overall load placed on this particular zone of the HVAC system 400 exceeds its rated capacity. Absent a sophisticated HVAC diagnostic system 100 that can dynamically detect such local anomalies and reflect their effect on the overall operation of a distributed HVAC system 400, the correction of such problems are extremely difficult.

User Data Input

At step 2601, diagnostic system 100 initiates the diagnostic process by requesting the user to input HVAC system definition information. This is accomplished by use of a plurality of menu screens that enable the user to simply and sequentially provide the diagnostic system 100 with sufficient architectural information concerning the HVAC system under test 400 to enable the diagnostic system 100 to define an appropriate data collection strategy and tests to be performed to analyze the operation of HVAC system under test 400.

FIG. 7 illustrates a typical initial sequence screen that is provided to the user on display 14 to enable the user to select one of the various heating, ventilating and air conditioning system component definition subroutines. It is obvious that the use of a mouse (not shown) rather than user input keyboard 15 would be beneficial to speed the data input task. For example, the user selects the entry "air distribution" by placing the cursor on this entry and clicking the mouse. In response thereto, controller 10 displays the screen of FIG. 8 to enable the user to identify what type of air distribution system is in use in the HVAC system under test 400. The items listed in FIG. 8 are well known HVAC air distribution systems and the particular example described herein is the variable air volume air distribution system. The user notes the selection by placing the cursor on the entry "variable air volume" and clicking the mouse. The user then activates the box labeled "continue" on the screen of FIG. 8 to return to the system choice screen of FIG. 7. The user can then select "heating distribution" to enter the screen of FIG. 9 to denote the type of heating system that is used in this structure. The screen of FIG. 9 lists a plurality of typical heating systems that would be found in a building. These are divided into three major categories: central heating, distributed heating, no heating system. In the example used herein, a central heating system is employed in the variable air volume HVAC system 400 and the particular heating unit, for example, can be a direct fired boiler. The user would then select the entry "direct fired" and the box "continue" in order to return to the system choices screen of FIG. 7. Another data entry requirement is the cooling distribution system definition. The user inputs this data by selecting the "cooling distribution" entry on the menu illustrated in FIG. 7 which causes the diagnostic system 100 to display the menu of FIG. 10, which lists various cooling system options that may be installed on this particular structure. Again, there are three primary architectural possibilities: central cooling, distributed cooling, no cooling system. In the system that is used in this example a central cooling system is employed and for the sake of simplicity, it is selected to be an evaporative cooler. The user enters "evaporative cooler" by clicking the mouse on this screen entry and then activates the "continue" box to return to the system choice screen illustrated in FIG. 7.

The user must also define the type of heating plant that is used in the HVAC system by selecting the box labeled "heating plant" on the menu of FIG. 7. This selection brings up the screen of FIG. 11 which defines the various types of central heating plants that are typically in use. For the sake of this description, it is assumed a gas boiler is used as the central heating plant and the user therefore clicks the mouse when the cursor is positioned on the selection "gas boiler" and again clicks the mouse on the continue entry to return to the menu selection screen of FIG. 7. A similar definition must be made of the central cooling plant by the user clicking the mouse on the "cooling plant" entry on the menu screen of FIG. 7 which brings up the menu screen of FIG. 12 wherein the user can select the appropriate central cooling plant used in the structure. Assume that a mechanical chiller is used in this structure. The user clicks the mouse when the cursor is positioned on the "mechanical chiller" entry, followed by clicking the mouse on the "continue" entry which brings up the menu screen of FIG. 7.

If the user selects the "options" entry on FIG. 7, the screen of FIG. 13 is displayed to enable the user to denote other optional features found in heating, ventilating and air conditioning system 400 that may be appropriate for this particular structure. As can be seen from the system architecture of FIG. 4, humidification and return/relief fans are two options that are found in this particular structure. The user clicks the mouse on these two entries of FIG. 13 to enter this data into diagnostic system 100 and then clicks the mouse on the "continue" entry to return to the system choices menu of FIG. 7. Finally, the number of zones in this particular structure must be defined and the user accomplishes this by clicking the mouse on the "zone" entry on the menu screen of FIG. 7. This brings up the screen of FIG. 14 to enable the user to define the number of zones contained within this building. As can be seen from FIG. 4, three zones are present in this structure and the user clicks the mouse on the "three" entry in FIG. 14 to enter this data, followed by clicking the mouse on the "continue" button to return to the system choices menu of FIG. 7.

Since all the system definition entries have been provided, the only choice left for the user in the system choices menu of FIG. 7 is to activate the "continue" entry to leave the system choices menu. The user thereby completes the select systems subroutine 232 portion of the system definition component 213 of control software 200. The HVAC system 400 has now been completely defined for the diagnostic system 100.

It is important to note that any type of system under test can be similarly defined if the system architecture and system components represent standardized or easily defined elements. In a heating, ventilating and air conditioning system, there is a large but finite number of selections of standard architectures and components and specific component interconnection may not be particularly relevant to enable the diagnostic system 100 to dynamically monitor the operation of the HVAC system 400 and identify potential faults contained therein. In particular, the length of duct between the central heating coil 406 and a particular variable air volume distribution box 413 is not particularly relevant for the diagnostic purposes of diagnostic system 100. What is important is whether sufficient air volume is reaching the destination distribution box 413 at the proper temperature and humidity to enable the distribution box 413 to perform its desired function. Thus, the major HVAC system components are defined as functional elements having inputs and outputs thereto and the diagnostic system 100 monitors the various components to determine whether environmental parameters measured at these inputs and outputs are appropriate. Since the primary components of a heating, ventilating and air conditioning system are relatively fixed and well defined, the specific interconnection of these elements as illustrated in FIG. 4 need not be specified for the diagnostic system 100 to perform the necessary parameter measurement and diagnostic activity. Once component failures and/or degradation in component performance are identified by the diagnostic system 100, the user can use the test results to identify the locus of the problem within the physical plant represented by the schematic of FIG. 4. The diagnostic system 100 can identify the components or an interface between components that represents a system performance problem and it is up to the user to translate these results to the physical plant that represents the system under test.

Develop Instrumentation Plan

Step 2602 in the system operation flow chart notes develop instrumentation plan. This represents the operational steps taken by the develop instrumentation plan software 244 to translate the system definition information input by the user into a data collection methodology that is appropriate for the particular system under test that was defined by the user. This instrumentation plan for a heating, ventilating and air conditioning system represents placing data gathering instrumentation at the various components or significant data collection points in order to obtain a real time, temporally coordinated set of data indicative of the operation of the system under test. Since there is a limited number of possible HVAC system architectures, data defining these architectures are stored in software and possibly in memory 17 as is data defining corresponding instrumentation plans. Each instrumentation plan defines what environmental parameters are to be measured at various air handling components of the HVAC system to obtain sufficient data to adequately monitor and analyze the operation of the HVAC system under test.

Figure 5:
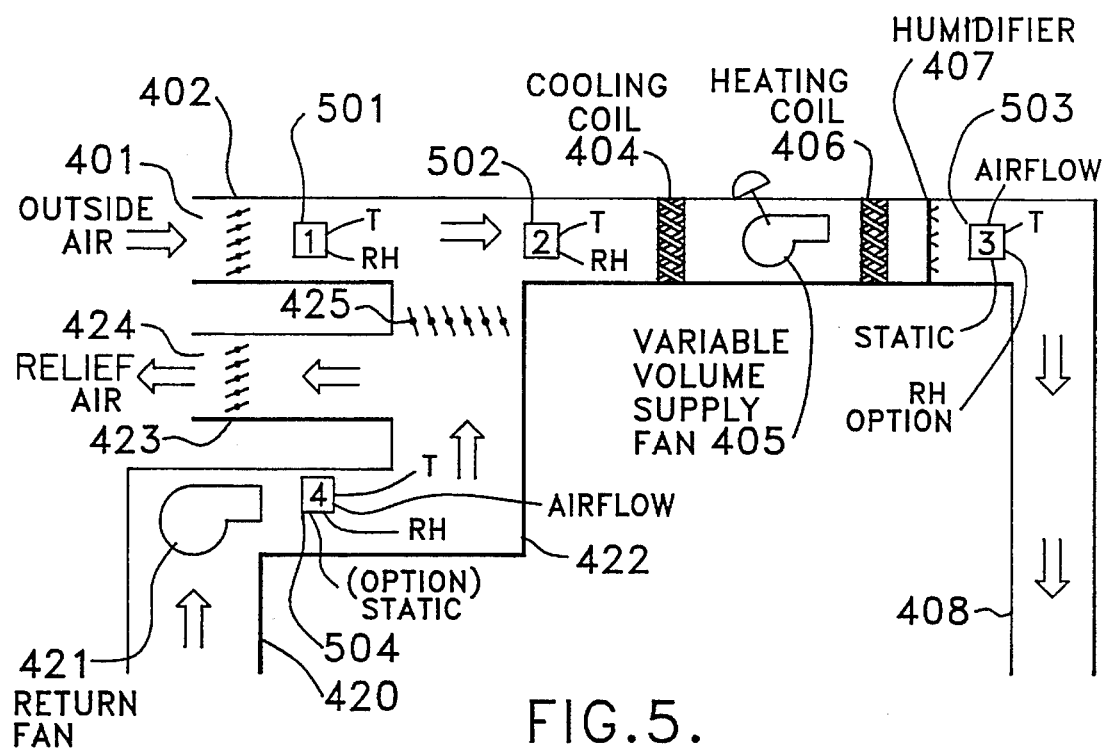
FIGS. 5 and 6 illustrate the typical placement of sensors in the components of the system under test.

As can be seen from FIG. 5, it is important to obtain data indicative of the operation of the cooling coil 404, heating coil 404, humidifier 407, the variable air volume distribution boxes 409, 413, 427 thermostats, as well as determine the nature of the return air that is delivered to the central heating, ventilating and air conditioning apparatus.

Install Sensors in Data Loggers

Figure 19:
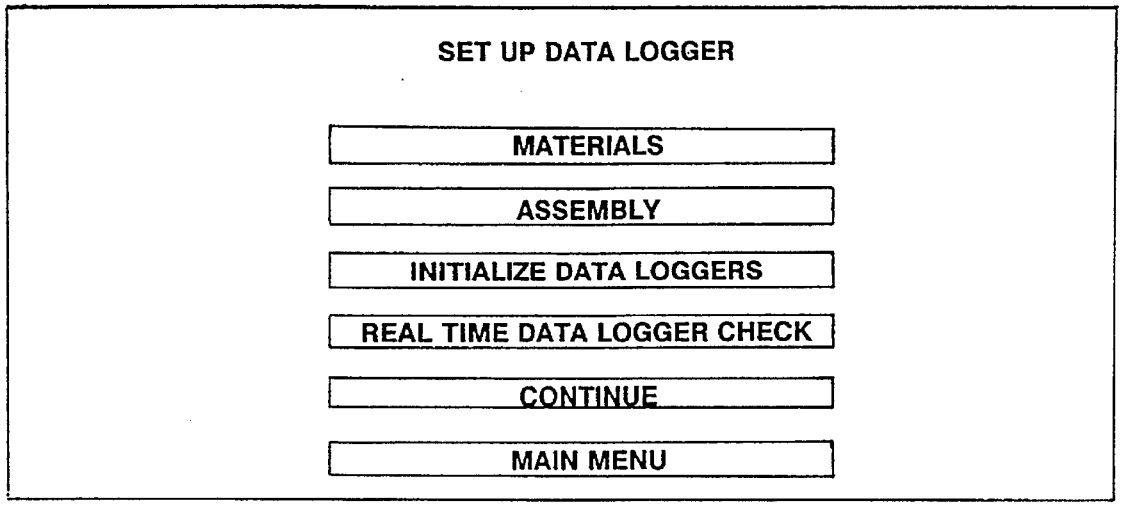
Figure 20:
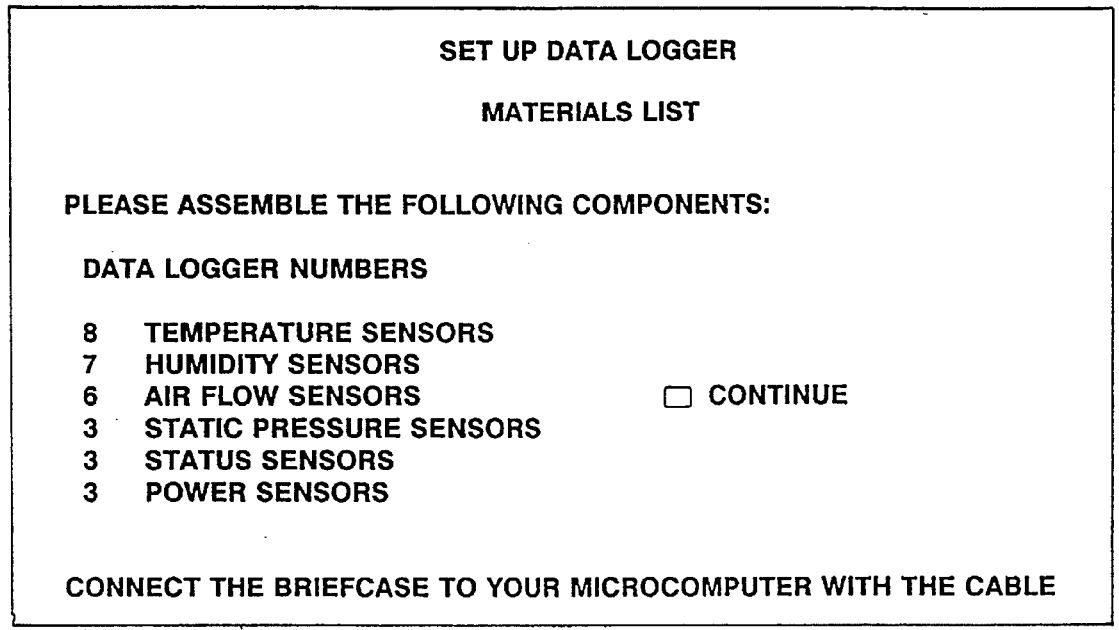

Once the system software develops the instrumentation plan, the diagnostic system 100 displays the menu screen of FIG. 19 on display 17 which indicates a number of sequential steps 2603 that the user must take to equip data loggers MDL* with sensors in order to enable the diagnostic system 100 to proceed with data collection operation. Manual intervention is necessary at this point due to the fact that each system under test has enough variables and is unique enough that a site specific set of data loggers MDL* must be used to perform the necessary tests. For example, if the user were to click the "materials" entry on the screen of FIG. 19, this causes the screen of FIG. 20 to be displayed, which illustrates the number and type of particular sensors SM, and data loggers MDL, that are required to perform the particular tests required of this system under test 400. The required components are available to the user as part of the instrumentation package that accompanies diagnostic system 100.

The user assembles the data loggers MDL* by interconnecting the designated sensors SM* into the appropriate data loggers MDL* as illustrated diagrammatically in FIG. 21. In particular, in one embodiment of this apparatus, a briefcase type of housing is used to implement interface unit 12 and interconnect twelve data loggers MDL* with controller 10. As each data logger MDL* is placed in its designated slot in interface unit 12, it is interconnected via a connector (not shown) to the controller 10. The user then interconnects designated sensors SM* into the four connectors that are part of each data logger MDL* pursuant to the chart illustrated in FIG. 21 in order to assemble the data loggers MDL* and complete the instrumentation necessary to take the required measurements. Once the data loggers MDL* are equipped with the appropriate sensors SM* as defined by the diagram of FIG. 21, the user clicks the mouse on the "continue" entry therein in order to access the screen of FIG. 22 where the user is queried to indicate the start time of the test and its duration.

Instrumentation Initialization

Once all of this data has been entered, the controller 10 initializes the data loggers using subroutine 242 by sequentially programming each data logger MDL* that is installed in interface unit 12. This is accomplished by controller 10 transmitting instructions from controller 10 to each data logger MDL* in interface unit 12 to indicate what sensors SM, are located thereon, to set the limits for each sensor, to calibrate the sensors, define the scan interval and the data store interval. In addition, the instructions function to program the data logger MDL* concerning the starting and stopping time and nature of the data collection process. In particular, the clocks 315 of all the data loggers MDL* are synchronized with the real time clock in controller 10 in order to enable all of the data loggers MDL* to operate temporally concurrently. Each data logger MDL, is programmed to begin taking data at a certain repetition frequency and to store the data in its local memory 312 if this is a battery operated wireless data logger MDL*. Some of the data loggers MDL* can be hardwired to controller 10 and need not store the data for the duration of the tests but instead transmit the data on demand or on a regular basis to the controller 10. The system software 242 in controller 10 checks and initializes each data logger MDL* and sensor SM* in the entire instrumentation package and checks the readings produced by each sensor to determine whether or not the proper sensor is installed on each channel of each MDL. Error messages are displayed if any problems are detected.

Instrumentation Installation

The system software 242 in controller 10 requests the user to install the data loggers MDL* at step 2604 in the correct locations in the system under test 400 illustrated in FIG. 4. In particular, the user is instructed to place the data loggers MDL* in the specific locales illustrated, for example, in FIGS. 5 and 6. At step 2605, the data loggers MDL* self activate in a temporally concurrent manner throughout the distributed components of the system under test 400 at the starting time and for the duration denoted by the user to collect data during normal building operations and over a predetermined period of time.

FIG. 5 illustrates a component of the instrumentation plan used to monitor the operation of the HVAC system 400 illustrated in FIG. 4. In particular, one data logger unit 501 is placed in the outside air intake duct 401 to monitor temperature and relative humidity of the ambient air that is input into HVAC system 400. A second data logger 504 is placed in the return duct 422 path to monitor the temperature, relative humidity, air flow and static air pressure in return duct 422. Downstream of the return duct 422 and outside air intake duct 401 is an appropriate place to place another data logger 502 to measure the temperature and relative humidity of the mixed outside and return air flows. Since the cooling coil 404 and heating coil 406 are mutually exclusive in their operation, placing a single data logger downstream from the centralized heating, conditioning and cooling apparatus can provide a measure of the operation of each of these units. A data logger 503 is placed in the main output duct 408 to measure temperature, air velocity, relative humidity and static air pressure of the air that leaves the central heating, ventilating and air conditioning plant for distribution to the distribution boxes 409, 413, 427 throughout the structure.

Figure 6:
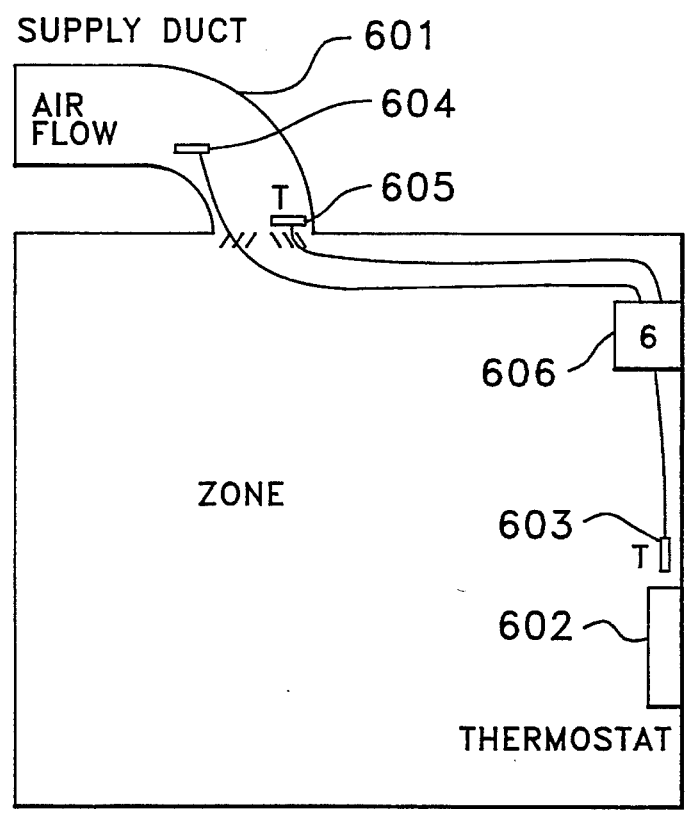

FIG. 6 illustrates a typical data logger installation at a supply duct 601 in a particular zone. A data logger 606 measures the temperature via sensor 605 and air flow via sensor 604 of the air that exits the supply duct 601. Data logger 606 also measures the temperature via temperature sensor 603 at the thermostat 602 to determine whether the thermostat 602 is properly triggering and whether the air that is supplied by the supply duct 601 to this zone is properly conditioned and is flowing at a proper rate to perform its function. Addition instrumentation can be installed in other locations throughout the structure and these examples are simply illustrative of typical installations that the diagnostic system software 200 selects as a result of the system definition information provided by the user.

The software that develops the instrumentation plan can be iterative in nature, in that an initial instrumentation plan is defined and implemented by the user and further testing can be performed as a result of the data collection obtained in the initial instrumentation operation. The further testing can refine the diagnostic analysis beyond system components to particular elements within a system component of the system under test 400. Therefore, an initial test can determine whether the general air flow to all of the distribution boxes 409, 413, 427 is appropriate and the temperature of the air obtained at each distribution box 409, 413, 427 is appropriate to define whether the central heating 406, cooling 404 and humidifying 407 units are operational and the air flow supplied by the variable volume supply fan 405 is sufficient to provide the heating and cooling necessary within the structure. If the initial test of this nature indicates that there theoretically should be no problem with the comfort of the plurality of zones Z1–Z3 contained within this building, a zone that is experiencing comfort problems can then be targeted for a subsequent set of tests. The successive tests can measure the operation of the plurality of thermostats located within the zone as well as air flow and temperature at various key locations within the zone to determine whether the air flow within the zone is uniform. This further analysis can determine whether any localized hot spots or cold spots exist due to the placement of occupants or equipment in the particular zone or due to equipment malfunction. This further instrumentation can also detect anomalies in air flow within the occupied space that would not be evident from monitoring the operation of the installed heating, ventilating and air conditioning apparatus 400. Suffice it to say, the number of iterations and the sophistication of the test performed is a matter of design choice and the embodiment illustrated herein is indicative of the generic philosophy used in such a diagnostic system 100 and is not intended to limit the scope or the applicability of this invention.

Gather Supporting System Under Test Defining Information

Once the user enters this data and activates the "continue" option, the screen of FIG. 15 is displayed wherein the user is requested to input some fundamental information concerning the capacities of the overall heating, ventilating and air conditioning system 400 in order to baseline the necessary data collection. Once all the entries are completed in the screen of FIG. 15, the user clicks the mouse on the "continue" button to enter the screen of FIG. 16 which enables the user to define which days of the test sequence represent days in which the building is occupied. Once all the occupied days are denoted and the user clicks the mouse on the "continue" entry, the screen of FIG. 17 is displayed and the user inputs the times of day when the heating, ventilating and air conditioning system 400 is scheduled to be activated on each of the occupied and unoccupied days. Once this data is entered, the user indicates the normal times of day when people are scheduled to occupy the premises. Once the user enters this information and clicks the "continue" button, further information is requested of the user to define the operational parameters of the heating, ventilating and air conditioning system 400.

Data Analysis

At the conclusion of the data gathering phase of operation, the user at step 2606 retrieves the data loggers MDL* and again installs them in interface unit 12 to connect them to controller 10. Once all the data loggers MDL* are installed in interface unit 12, at step 2607, read data logger subroutine 243 in controller 10 downloads the data from each of the data loggers MDL* into the appropriate files that have been created in controller 10. The data is placed in these files in a manner where the data is temporally coordinated and segregated according to the component monitored by the particular data logger MDL*. Therefore, a real time picture of the operation of all of the components illustrated in FIG. 4 is obtained and stored in memory 17 in a manner that enables the perform analysis software 244 to obtain a real time picture of the operation of all of the components contained in the system under test 400.

At step 2608, the diagnostic system 100 performs the necessary calculations to analyze the operation of the system under test 400. A predetermined number of standard tests can be performed or the user can select at step 2609 one or many of the predetermined performance analyses as indicated by the screen of FIG. 25 which enables the user to define which analyses are to be performed on the data that has been collected by the various data loggers MDL*. The diagnostic system 100 performs the designated tests in perform analysis software 261 by algorithmically calculating various performance factors via, for example, an artificial neural network, making use of the data contained in the data files. This is basically a repeated pattern recognition approach that compares the measured performance factors of the system under test 400 with optimized and typical failure mode performance factors to detect anomalies in the operation of system under test 400. At step 2610, the calculated actual performance factors, the optimum and typical failure mode performance factors and the anomalies are input to software or diagnostic pathways in the artificial neural network system to diagnose the system under test 400 to identify a failed component or a degradation in the performance of at least one of the components contained in the system under test 400. This produces a deterministic diagnosis to identify the most likely component in the system under test 400 that has exhibited performance problems. In the context used herein, performance factors represent measured and/or calculated operational characteristics of the system under test, which operational characteristics are representative, either directly or inferentially of the efficacy of operation of the system under test. It is not uncommon that the performance analysis variables cannot be directly measured, but must be calculated from other measured data. Therefore, the perform analysis software 261 calculates all the performance analysis variable data that cannot be directly measured for all the operational characteristics identified by develop instrumentation plan software 244 as relevant for this system under test 400.

Once the measured and calculated performance factors are determined, they are compared to optimum performance factors to determine whether anomalies exist therein. If the system under test performance factors are not within the nominal range of operation, they are compared by perform analysis software 261 with performance factors that are representative of typical failure modes of the system under test. Each failure typically has a characteristic "signature" as evidenced by certain variations in the performance factors. Thus, by comparing the measured and/or calculated performance factors with typical failure mode and optimum performance factors, a correspondence can be identified with one or more system failures.

At step 2611, the report generator software 262 presents the resultant diagnosis to the user at several levels, indicating a most likely unit experiencing problems and a specification of the detected performance problem.

On the basis of the analysis performed in perform analysis software 261, different levels of reports are available for different uses-from a general "here's what's wrong", to a listing of probability of performance problems, to specifying additional diagnostic tests that may be required at a component level, or to suggest other tests that should be performed. The test results are presented as a series of reports, including: description of building/system tested; description of instrumentation plan; results of diagnostic tests; and recommendations for further tests. Reports can also be in the form of a graphical representation of a performance factor output by report generator software 262, such as illustrated in FIG. 27, which is a graphical analysis of the performance of the main air moving fan 405 where the fan 405 is not achieving its full flow. This is evidenced by the top of the air flow curve illustrated in FIG. 27 being truncated at approximately sixty percent of full air flow which is typically indicative of an obstruction in the ducts 403, 408, 420, 422, or malfunctioning fan controls, or a fan 405 that is not performing up to specifications. The chart of FIG. 27 should be dome shaped instead of having a flat top and the fact that the peak of the curve is reached early in the day is indicative that there is need for additional air circulation that is not being supplied by the HVAC system 400. The perform analysis software 261 would typically include data representative of the characteristic curve shown in FIG. 27 and when the measured performance factor substantially matched this characteristic shape, the perform analysis software 261 can then identify the detected symptoms, likely nature of the problem as well as the component most likely in a failure mode. Thus, by providing the plurality of data loggers MDL* at spatially distributed locations throughout the system under test 400, actual measurements of the operation of each of the components can be identified by the controller 10 during the analysis phase of operation. It is obvious that some of the data loggers MDL* can be hardwired to controller 10 or interface unit 12 while others may operate in a wireless mode in order to most efficiently collect the data and return it to controller 10 for distillation and analysis therein.

Diagnostic Method and Apparatus

Computer 10 illustrated in FIG. 1 as well as the perform analysis subroutine 261 illustrated in FIG. 2 can be implemented in a number of alternative configurations. The perform analysis subroutine 261 illustrated in FIG. 2 can be software, hardware or a combination of both to implement the diagnostic function required of this system. In particular, FIG. 28 illustrates conceptually that this function must be divided into two levels: classification (subsymbolic) level and inference (symbolic) level. On the classification level, the input data is used to identify symptoms of an anomaly or a plurality of anomalies that exist in the HVAC system under test. Once the symptoms have been identified by the classification level of this process, the inference level can correlate the various detected symptoms and associated relevant data to perform a final diagnosis to identify one (or more) of the operationally interdependent components that is failing to perform according to its nominal specifications. These two levels of analysis apparatus and process within computer 10 can be implemented in a number of alternative ways. The various alternatives all fall under the general classification of artificial intelligence techniques which make use of neural networks, expert systems and fuzzy logic systems to automatically perform the diagnostic process. The use of artificial intelligence reduces the potential for human error and increases the consistency of the diagnostic results produced by this diagnosis system. A first artificial intelligence methodology is the artificial neural network which consists of a set of simple processing units that are interconnected in a series of layers, each of which typically includes a plurality of processing units. Each processing unit processes information by summing the activity of the units that serve as an input to it then passing the summation activity to other subsequent units in the network. The interconnections between the various processing units are implemented using weighting functions which provide variable outputs. These weighting functions are modified by feedback from subsequent layers within the artificial neural network while the network is being trained on a set of information that represents the problem being modeled. Therefore, an artificial neural network can be made to generalize new information to identify patterns or trends in the information. Artificial neural networks deal with conflicting or missing input information in a graceful manner and can generalize their learned knowledge to unfamiliar situations.

An expert system is an alternative artificial intelligence that comprises a functional encapsulation of rules from an expert about a specific problem. Expert systems use a set of expert rules to infer conclusions from known conditions. The rules are generally in the form of if—then statements architected in a hierarchy of decision steps, wherein the rules are chained together to reach an ultimate conclusion based on the input data. The primary strength of expert systems is in its inference engine. This is the method by which the rule base is evaluated. The inference engine processes all of the rules and determines which rules are in a true state to determine what impact a fact has on the rest of the rules. The inference engine keeps processing the rule base to generate conclusions as they occur until all the rule base has been completely evaluated. However, expert systems work on a hard, logical basis and there are no marginal states: any given condition is either explicitly true or false at a given time.

Fuzzy logic systems represents a third class of artificial intelligence and are similar to expert systems, except that they classify facts in a gradual continuous manner. Fuzzy logic blurs the boundaries of the conditional true and false states into a set of more continuous categorizations.

FIG. 28 represents a preferred embodiment of the implementation of the diagnostic method and apparatus for this system making use of two types of artificial intelligence. In a typical HVAC system, the plurality of operationally interdependent air handling components exhibit a wide range of variation in their operating parameters and the environmental conditions which they encounter. Therefore, the diagnostic engine that is implemented in computer 10 must be able to handle incomplete or conflicting data and a wide diversity of systems under test. Since an expert system requires hard coding of all of the rules to model each system that can be encountered, an expert system is a relatively undesirable choice for implementing the classification level section of the diagnostic system. Since artificial neural networks function by means of probabilistic logic, they are more flexible in dealing with actual data which tends to be less orderly and less predictable than that required for efficient use of an expert system. Fuzzy logic systems are related to expert systems in that they are rule based systems that are chained together and the rule represents a weak link in attempting to classifying the performance factors typically found in an HVAC system under test. Since artificial neural networks learn autonomously by example, hand coding of the logic contained therein is unnecessary. The use of an artificial neural network as the classification (subsymbolic) level segment of the diagnostic engine is a preferred choice since an artificial neural network looks at the entire HVAC system, one performance factor at a time and can draw out the symptoms representative of any performance anomalies therein. The artificial neural network is typically a multiple layer configuration illustrated generically in FIG. 28. An input layer receives data representative of the measured value of each predetermined environmental parameter from each data logger unit used to monitor the system under test. The processing units that comprise the input layer combine various ones of these input values to calculate parameters indicative of the operation of HVAC system under test. For example, the measured temperature, humidity and static air pressure can be used to calculate the energy content of an air stream. Therefore, by calculating various parameters, these parameters can be fed to the subsequent layers of the artificial neural network to compute the performance factors that are indicative of the overall operation of the operationally interdependent air handling components in the HVAC system under test. These calculated performance factors can then be compared to model performance factors indicative of the operation of an optimized HVAC system as well as to performance factors indicative of the operation of a system in a known failure mode. The relations between the measured performance factors and the optimized and failure mode performance factors are identified by the output layer which outputs data indicative of detected anomalies in the operation of the HVAC system under test. These symptoms or anomalies are then processed by the inference (symbolic) level segment of the diagnostic engine. The inference level of the diagnostic engine can be implemented using an expert system or a fuzzy logic system since symptoms can be correlated via a fairly simple rule set to identify the problem that is causing the anomalies detected in the system performance.

A typical HVAC system can be analyzed by using a reasonably small subset of performance factors, each of which represents the plotting of data collected on a regular basis (such as hourly) versus time or versus another parameter measured in the system under test. Furthermore, there are a finite and reasonably small number of potential HVAC system configurations to simplify the diagnostic task that must be performed by this system. Therefore, a relatively simple artificial neural network implementation can be used to implement the first segment of the diagnostic engine. Furthermore, the rule set required of the expert system or second segment of the diagnostic engine can be programmed to analyze the deterministic factors that represent typical performance problems within an HVAC system. The methodology used herein is also applicable to other systems under test and the HVAC system implementation is simply used as an illustrative teaching of the concepts of this invention.

While a specific embodiment of this invention has been disclosed, it is expected that those skilled in the art can and will design alternate embodiments of this invention that fall within the scope of the appended claims.

We claim:

1. A maintenance apparatus for analyzing a system under test, which system under test has a plurality of operationally interdependent components, at least one of which is spatially disjunct from the remainder of said components, comprising:

control means;

a plurality of data collecting means, each said data collecting means being installable in said operationally interdependent components for measuring predefined parameters at said operationally interdependent components, absent direct connection to said control means while said data collection means are installed in said operationally interdependent components, each of which data collecting means comprises:

means for determining a value for at least one predetermined parameter at each of a plurality of points in time, means for storing a plurality of sets of data, each said set of data being indicative of each said determined value of each said predetermined parameter at a one of said plurality of points in time, means for temporally enabling said determining means simultaneously with said determining means located in others of said data collecting means independent of said control means, means for transmitting a plurality of said sets of said collected data to said control means;

wherein said control means comprises:

means for storing each said set of collected data received from said plurality of data collecting means, and means for analyzing said system under test using said stored sets of data to identify performance problems in said system under test.

2. The apparatus of claim 1 wherein said control means further comprises:

means for receiving initialization data from a user that specifics operational characteristics of said system under test, said initialization data defining said plurality of operationally interdependent components; and means, responsive to said initialization data, for selecting said predetermined parameters for each said plurality of data collecting means.

3. The apparatus of claim 2 wherein said control means further comprises:

means for displaying to a user data indicative of said selected predetermined parameters for each said plurality of data collecting means to enable said user to equip each said plurality of data collecting means with determining means to perform tests to determine said value for said selected predetermined parameters.

4. The apparatus of claim 1 wherein said control means comprises:

means for transmitting data to said plurality of data collecting means to temporally coordinate said plurality of data collecting means.

5. The apparatus of claim 4 wherein said control means further comprises:

means for temporally coordinating said stored sets of collected data-to form a set of real time indicia indicative of the simultaneously measured values for all said selected predetermined parameters for all said data collecting means at said predefined points in time.

6. The apparatus of claim 1 wherein said temporally coordinating means in each said data collecting means activates said determining means at said predefined points of time to determine said value for said selected predetermined parameter.

7. The apparatus of claim 1 wherein said analyzing means comprises:

means for storing data indicative of typical failure mode performance of said system under test; and means for comparing said collected data to said stored data indicative of failure mode performance of said system under test to identify system under test performance anomalies in said collected data.

8. The apparatus of claim 7 wherein said analyzing means further comprises:

means, responsive to detected anomalies, for identifying at least one of said operationally interdependent components that failed to function properly.

9. The apparatus of claim 8 wherein said control means further comprises:

means, responsive to an identified failed operational component, for displaying in human readable form data identifying said failed component.

10. The apparatus of claim 1 wherein said analyzing means comprises:

means for storing data indicative of typical failure mode performance of each of said operationally interdependent components of said system under test; and means for comparing said collected data to said stored data indicative of failure mode performance of said operationally interdependent components of said system under test to identify system under test performance anomalies in said collected data.

11. The apparatus of claim 10 wherein said analyzing means further comprises:

means, responsive to detected anomalies, for identifying at least one of said operationally interdependent components that failed to function properly.

12. The apparatus of claim 11 wherein said control means further comprises:

means, responsive to an identified failed operational component, for displaying in human readable form data identifying said failed component.

13. The apparatus of claim 1 wherein each said data collecting means further comprises:

battery means for supplying power to said storing means to maintain said collected data.

14. The apparatus of claim 1 wherein said analyzing means comprises:

artificial intelligence means for processing said collected data to identify a failed component in said system under test.

15. The apparatus of claim 14 wherein said artificial intelligence means comprises:

first processing means for processing said collected data to create at least one symptom, indicative of an identifiable effect of a failed component in said system under test.

16. The apparatus of claim 15 wherein said artificial intelligence means further comprises:

second processing means for processing said created symptoms to identify at least one failed component in said system under test that has caused said symptoms.

17. The apparatus of claim 15 wherein said first processing means comprises a neural network.

18. The apparatus of claim 16 wherein said second processing means comprises an expert system that is programmed with a set of rules to deduce the identity of said at 19. The apparatus of claim 1 wherein said transmitting means comprises a wireless transmitter for transmitting data to said control means at a radio frequency.

20. A method for analyzing a system under test which system under test has a plurality of operationally interdependent components, at least one of which is spatially disjunct from the remainder of said components, using a central control unit and a plurality of data collection units installable in said operationally interdependent components absent direct connection to said control means while said data collection units are installed in said operationally interdependent components, for measuring predefined parameters at said operationally interdependent components, comprising the steps of:

- determining at each of said data collection units a value for at least one predetermined parameter at predefined points in time.
- storing a plurality of sets of data, each said set of data being indicative of each said determined value of each said predetermined parameter at a one of said plurality of points in time,
- temporally enabling said step of determining in at least one of said data collection units simultaneously with said step of determining in others of said data collection units independent of said central control unit,
- transmitting said plurality of sets of said collected data to said central control unit from each of said data collection units;
- storing in said central control unit each said set of collected data received from said plurality of data collection units, and
- analyzing in said central control unit said system under test using said stored sets of data to identify performance problems in said system under test.

21. The method of claim 20 further comprising the step of:
- transmitting data to said plurality of data collection units to temporally coordinate said plurality of data collection units.

22. The method of claim 20 wherein the step of analyzing includes:
- storing data indicative of typical failure mode performance of said system under test; and
- comparing said collected data to said stored data indicative of typical failure mode performance of said system under test to identify system under test performance anomalies in said collected data.

23. The method of claim 22 wherein said step of analyzing further includes:
- identifying, in response to detected anomalies, at least one of said operationally interdependent components that failed to function properly.

24. The method of claim 23 further comprising the step of:
- displaying, in response to an identified failed operational component, in human readable form data identifying said failed component.

25. The method of claim 20 wherein said step of analyzing includes:
- storing data indicative of typical failure mode performance of each of said operationally interdependent components of said system under test; and
- comparing said collected data to said stored data indicative of typical failure mode performance of said operationally interdependent components of said system under test to identify system under test performance anomalies in said collected data.

26. The method of claim 25 wherein said step of analyzing further includes:
- identifying, in response to detected anomalies, at least one of said operationally interdependent components that failed to function properly.

27. The method of claim 26 further comprising the step of:
- displaying, in response to an identified failed operational component, in human readable form data identifying said failed component.

28. The method of claim 20 wherein said step of analyzing comprises:
- processing, using artificial intelligence apparatus, said collected data to identify a failed component in said system under test.

29. The method of claim 28 wherein said artificial intelligence apparatus performs the step of:
- processing said collected data to create at least one symptom, indicative of an identifiable effect of a failed component in said system under test.

30. The method of claim 29 wherein said artificial intelligence further performs the step of:
- processing said created symptoms to identify at least one failed component in said system under test that has caused said symptoms.

31. The method of claim 29 wherein said first processing apparatus comprises a neural network.

32. The method of claim 20 wherein said step of transmitting comprises transmitting data to said controller at a radio frequency.

33. A method for analyzing a system under test which system under test has a plurality of operationally interdependent components, at least one of which is spatially disjunct from the remainder of said components, using a central control unit and a plurality of dam collection units installable in said operationally interdependent components for measuring predefined parameters at said operationally interdependent components, comprising the steps of:

- determining at each of said data collection units a value for at least one predetermined parameter at predefined points in time,
- storing a plurality of sets of data each said set of data indicative of each said determined value of each said predetermined parameter at a one of said plurality of points in time,
- temporally enabling said step of determining in at least one of said data collection units in temporal coordination with said step of determining in others of said data collection units independent of said central control unit,
- transmitting said plurality of sets of said collected data to said central control unit from each of said data collection units;
- storing in said central control unit each said set of collected data received from said plurality of data collection units, and
- analyzing in said central control unit said system under test using said stored sets of data to identify performance problems in said system under test.

34. The method of claim 33 further comprising the steps of:
- receiving initialization data at said central control unit from a user that specifies operational characteristics of said system under test, said initialization data defining said plurality of operationally interdependent components; and selecting, in response to said initialization data, said predetermined parameters for each said plurality of data collection units.

35. The method of claim 33 wherein said step of temporally coordinating in each said data collection units activates said step of determining at said predefined points of time to determine said value for said selected predetermined parameters.

36. The method of claim 35 further comprising the step of:
temporally coordinating said stored sets of collected data to form a set of real time indicia indicative of the simultaneously measured values for all said selected predetermined parameters for all said data collection units at said predefined points in time.

37. The method of claim 36 wherein said second processing apparatus comprises an expert system that is programmed with a set of rules to deduce the identity of said at least one failed component from said symptoms.

38. A maintenance system for analyzing an HVAC system which HVAC system has a plurality of operationally interdependent air handling components, at least one of which is spatially disjunct from the remainder of said air handling components, comprising:
control means;
a plurality of data collecting means, each of which data collecting means is installable in said air handling components to measure environmental parameters at said air handling components, at least one of which data collecting means operates absent a direct electrical connection to said control means and each of which includes:
means for determining a value for at least one environmental parameter at a one of said air handling components at predefined points in time,
means for storing a plurality of sots of data, each said set of data being indicative of each said determined value of each said environmental parameter at a one of said plurality of points in time,
means for temporally enabling said determining means simultaneously with said determining means located in others of said data collecting means independent of said control means,
means for transmitting a set of said collected data to said control means;
wherein said control means includes:
means for storing each said set of collected data received from said plurality of data collecting means, and
means for analyzing said HVAC system using said stored sets of data to identify performance problems in said HVAC system.

39. The apparatus of claim 38 wherein said control means further comprises:
means for receiving initialization data from a user that specifies operational characteristics said HVAC system under test, said initialization data defining said plurality of operationally interdependent air handling components; and
means, responsive to said initialization data, for identifying a site in said plurality of air handling components to install each said data collecting means and a set of said identified environmental parameters to be measured by each said plurality of data collecting means.

40. The apparatus of claim 39 wherein said control means further comprises:
means for displaying to a user data indicative of both said installation site and said identified environmental parameters for each said plurality of data collecting means to enable said user to program and install each said plurality of data collecting means to perform tests to determine said value for said identified environmental parameters.

41. The apparatus of claim 38 wherein said temporally coordinating means in each said data collecting means activates said determining means at said predefined points of time to determine said value for said identified environmental parameters.

42. The apparatus of claim 38 wherein said control means further comprises:
means for transmitting data to said plurality of data collecting means to temporally coordinate said plurality of data collecting means.

43. The apparatus of claim 41 wherein said control means further comprises:
means for temporally coordinating said stored sets of collected data to form a set of real time indicia indicative of the simultaneously measured values for all said identified environmental parameters at said predefined points in time.

44. The apparatus of claim 38 wherein said analyzing means comprises:
means for storing data that defines a plurality of performance factors indicative of typical failure mode performance of said HVAC system under test;
means for using said collected data to compute measured performance factors that correspond to said plurality of typical failure mode performance factors; and
means for comparing said measured performance factors to said typical failure mode performance factors of said HVAC system under test to identify anomalies in operation of said HVAC system under test as reflected in said collected data.

45. The apparatus of claim 44 wherein said analyzing means further comprises:
means, responsive to identified anomalies, for identifying at least one of said operationally interdependent air handling components that failed to function properly.

46. The apparatus of claim 45 wherein said control means further comprises:
means, responsive to an identified failed operational component, for displaying in human readable form data identifying said failed component.

47. The apparatus of claim 46 wherein said analyzing means comprises:
neural network means for processing said collected data to create at least one symptom, indicative of an identifiable effect of a failed component in said system under test.

48. The apparatus of claim 46 wherein said analyzing means further comprises:
expert system means programmed with a set of rules for processing said created symptoms to deduce the identity of at least one failed component in said system under test that has caused said symptoms.

49. The apparatus of claim 38 wherein said transmitting means comprises a wireless transmitter for transmitting data to said control means at a radio frequency.

50. The apparatus of claim 38 wherein each said data collecting means further comprises:
battery means for supplying power to said storing means to maintain said collected data.

51. A method of operating a maintenance system having a controller for analyzing an HVAC system, which HVAC system has a plurality of operationally interdependent air handling components, at least one of which is spatially disjunct from the remainder of said air handling components, comprising the steps of:

measuring environmental parameters at said air handling components using a plurality of apparatus for collecting data, each said data collecting apparatus being installable in said air handling components, at least one of which data collecting apparatus operates absent a direct electrical connection to said controller, including:

determining a value for at least one environmental parameter at a one of said air handling components at predefined points in time, storing a plurality of sets of data, each said set of data being indicative of each said determined value of each said environmental parameter at a one of said plurality of points in time, temporally enabling said step of determining simultaneously with others of said data collecting apparatus independent of said controller, transmitting a plurality of sets of said collected data to said controller;

storing each said set of collected data received from said plurality of data collecting apparatus in said controller, and analyzing said HVAC system using said stored sets of data to identify performance problems in said HVAC system.

52. The method of claim 51 further comprising the steps of:

receiving initialization data from a user that specifies operational characteristics of said HVAC system under test, said initialization data defining said plurality of operationally interdependent air handling components; and identifying, in response to said initialization data, a site in said plurality of air handling components to install each said data collecting apparatus and a set of said identified environmental parameters to be measured by each said plurality of data collecting apparatus.

53. The method of claim 52 further comprising the step of:

displaying to a user data indicative of both said installation site and said identified environmental parameters for each said plurality of data collecting apparatus to enable said user to program and install each said plurality of data collecting apparatus to perform tests to determine said value for said identified environmental parameters.

54. The method of claim 51 wherein each said data collecting apparatus performs measurements of said identified environmental parameters at predefined points of time to determine said value for said identified environmental parameters.

55. The method of claim 51 further comprising the step of:

transmitting data to said plurality of data collecting apparatus to temporally coordinate said plurality of data collecting apparatus.

56. The method of claim 54 further comprising the step of:

temporally coordinating said stored sets of collected data to form a set of real time indicia indicative of the simultaneously measured values for all said identified environmental parameters at said predefined points in time.

57. The method of claim 51 wherein said step of analyzing comprises:

storing data that defines a plurality of performance factors indicative of typical failure mode performance of said HVAC system under test;

using said collected data to compute measured performance factors that correspond to said plurality of typical failure mode performance factors; and comparing said measured performance factors to said typical failure mode performance factors of said HVAC system under test to identify anomalies in operation of said HVAC system under test as reflected in said collected data.

58. The method of claim 57 wherein said step of analyzing further comprises:

identifying, in responsive to identified anomalies, at least one of said operationally interdependent air handling components that failed to function properly.

59. The method of claim 58 further comprising the step of:

displaying, in response to an identified failed operational component, in human readable form data identifying said failed component.

60. The method of claim 51 wherein said step of analyzing comprises:

processing, using neural network apparatus, said collected data to create at least one symptom, indicative of an identifiable effect of a failed component in said system under test.

61. The method of claim 60 wherein said step of analyzing further comprises:

processing, using an expert system apparatus programmed with a set of rules, said created symptoms to deduce the identity of at least one failed component in said system under test that has caused said symptoms.

62. The method of claim 51 wherein said step of transmitting comprises transmitting data at a radio frequency.

* * * * *

UNITED STATES PATENT AND TRADEMARK OFFICE
CERTIFICATE OF CORRECTION

PATENT NO. : 5,481,481

DATED : January 2, 1996

INVENTOR(S) : Frey et al.

It is certified that error appears in the above-indentified patent and that said Letters Patent is hereby corrected as shown below:

ON THE TITLE PAGE:

Page 1 [75]  change "Michael J. Holtz" to --David N. Wortman--

Signed and Sealed this

Ninth Day of July, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,481,481

DATED : January 2, 1996

INVENTOR(S) : Frey et al.

It is certified that error appears in the above-identified patent and that said Letters Patent is hereby corrected as shown below:

On the title page, Item [73], Assignee : change " Architectural Engergy Corporation " to read -- Architectural Energy Corporation --.

Signed and Sealed this

Seventeenth Day of September, 1996

Attest:

BRUCE LEHMAN

Attesting Officer

Commissioner of Patents and Trademarks